(12) United States Patent
Fujinami et al.

(10) Patent No.: US 6,543,920 B2
(45) Date of Patent: Apr. 8, 2003

(54) VEHICLE HEADLAMP

(75) Inventors: Hiroki Fujinami, Shizuoka (JP); Norihiro Nishitani, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/010,415

(22) Filed: Dec. 6, 2001

(65) Prior Publication Data
US 2002/0075695 A1 Jun. 20, 2002

(30) Foreign Application Priority Data
Dec. 14, 2000 (JP) .................................. 2000-380137

(51) Int. Cl.⁷ .................................................. F21Q 1/04
(52) U.S. Cl. ........................ 362/517; 362/544; 362/546
(58) Field of Search ................................ 362/517, 518, 362/297, 346, 516, 265, 546, 544

(56) References Cited

U.S. PATENT DOCUMENTS

| | | | |
|---|---|---|---|
| 5,879,073 A | 3/1999 | Hori et al. | 362/344 |
| 5,895,113 A | 4/1999 | Ozaki et al. | 362/546 |
| 5,941,633 A | 8/1999 | Saito et al. | 362/543 |
| 6,129,448 A | 10/2000 | Takasaki et al. | 362/543 |
| 6,161,951 A | 12/2000 | Yoneyama et al. | 362/516 |
| 6,322,239 B1 * | 11/2001 | Nitta et al. | 362/543 |
| 6,394,636 B1 * | 5/2002 | Ashizawa et al. | 362/517 |
| 6,419,382 B1 * | 7/2002 | Nakagawa et al. | 362/547 |
| 6,439,753 B1 * | 8/2002 | Sumada et al. | 362/475 |

FOREIGN PATENT DOCUMENTS

| | | | | |
|---|---|---|---|---|
| DE | 10012896 A1 | 3/2000 | | F21V/14/00 |
| GB | 2248293 A | 4/1992 | | F21M/7/00 |

\* cited by examiner

*Primary Examiner*—Thomas M. Sember
(74) *Attorney, Agent, or Firm*—Fish & Richardson P.C.

(57) ABSTRACT

A vehicle headlamp includes right and left reflectors disposed in a lamp body and a ballast that allows a discharge bulb mounted in the reflector to continue a stable discharge. The pair of right and left reflectors is offset in the vertical direction. The right reflector is also offset in the fore-and-aft direction to be located behind the adjacent left reflector. The ballast is disposed to extend over enlarged spaces extending from below the right reflector. Thus, the center of gravity of the ballast is made close to the center of gravity of the headlamp excluding the ballast.

4 Claims, 9 Drawing Sheets

VEHICLE HEADLAMP

BACKGROUND OF THE INVENTION

The present invention relates to a movable reflector type vehicle headlamp where a reflector to which a discharge bulb is fitted is tiltably supported by an aiming mechanism. More particularly, it relates to a vehicle headlamp in which a ballast circuit unit that allows the discharge bulb to discharge stably is housed in a lamp body.

As shown in FIG. 9, in a conventional vehicle headlamp of this type, a reflector unit 2, which integrates a pair of right and left reflectors 3, 4, is housed in a lamp body 1. A discharge bulb 5 is fitted in the reflector 3 and an incandescent bulb 6 is fitted in the other reflector 4. An aiming mechanism E including one aiming pivot point a and two aiming screws b, c is interposed between the reflector unit 2 and a lamp body back surface wall 1a. The reflector unit 2 is tiltably and adjustably provided with respect to the lamp body 1. Reference numerals Lx1, Ly1 denote a horizontal tilting axis and a vertical tilting axis of the reflector unit 2.

The aiming pivot point a is disposed between the right and left reflectors 3, 4 so that the reflector unit 2 can be tilted by rotating the lateral direction aiming screw c.

A reference numeral 7 denotes a ballast circuit unit that allows the discharge bulb to discharge. It is disposed on an inside of a lamp body bottom surface wall 1b. An output cord 7a from the ballast circuit unit 7 is connected to a back end portion of the discharge bulb 5.

However, because the heavy ballast circuit unit 7 is provided immediately below the discharge bulb 5, it may vibrate because of vehicular motion. Namely, because the center of gravity G1 of the headlamp excluding the ballast circuit unit 7 is far away from the center of gravity G2 of the ballast circuit unit 7 alone, the entire headlamp may vibrate from the motion of the vehicle, resulting in abnormal noise, asymmetric friction, and misaligned optical axis and the like.

SUMMARY OF THE INVENTION

An object of the present invention is to provide a vehicle headlamp that does not vibrate by locating the center of gravity of the ballast circuit unit housed in the lamp body near the center of gravity of the lamp fixture.

To achieve the above object, a pair of first and second reflectors are disposed in a lamp body, a discharge bulb is fitted in at least one of the reflectors, and a ballast circuit unit that allows the discharge bulb to discharge stably is disposed at a lower portion inside the lamp body. In the vehicle headlamp, the pair of first and second reflectors are offset in a vertical direction so that a bottom surface of a first reflector is located at a higher position than a bottom surface of a second reflector that is adjacent to the first reflector. The first reflector is offset with respect to the second reflector in a fore-and-aft direction so that the first reflector is located behind the second reflector. The ballast circuit unit is disposed in an enlarged space that extends from below the first reflector to a back of the second reflector in the lamp body.

A first space large enough to house therein the ballast circuit unit is provided below the first reflector that is offset upward. However, even if the ballast circuit unit is disposed immediately below the first reflector, the center of gravity of the ballast circuit would not be aligned with the center of gravity of the headlamp excluding the ballast circuit unit.

Therefore, the first reflector is offset behind the second reflector (the second reflector is offset ahead of the first reflector) to free a side (on the second reflector side) of the first space below the first reflector, and the ballast circuit unit is disposed in a space including this freed space.

Because the second reflector is disposed ahead of the first reflector, a second space is formed that laterally communicates with the first space at the back of the second reflector. In other words, the first space below the first reflector is laterally enlarged by a space equivalent to the second space behind the second reflector.

If the ballast circuit unit is disposed to extend over the first space and the second space that communicate with each other, the center of gravity of the ballast circuit unit alone is made near the center of gravity of the headlamp excluding the ballast circuit unit.

In another embodiment of the invention, the first and the second reflectors of the headlamp are integrated together to form a reflector unit and are tiltably supported by an aiming mechanism interposed between the lamp body and the reflector unit. The ballast circuit unit is housed in a ballast housing chamber defined by a ballast cover attached to the lamp body and a lamp body bottom surface wall. The ballast cover is provided with an aiming pivot point of the aiming mechanism.

Because the right and left reflectors (the first and the second reflectors) are integrally formed as the reflector unit, the construction of the aiming mechanism is made simple.

Further, because the construction of the aiming mechanism is simple, interferences can be avoided between the aiming mechanism and the ballast cover that forms the ballast housing chamber.

In addition, because the ballast circuit unit is housed in the ballast housing chamber, the ballast circuit unit does not vibrate.

Also, because the right and left reflectors are integrated as the reflector unit, a load is made greater at a reflector unit side acting on a portion surrounding the aiming pivot point. However, because the aiming pivot point is provided between the ballast cover (located ahead of the lamp body back surface wall) and the reflector unit, the distance between members where the aiming pivot point is interposed is shorter than when the aiming pivot point is provided between the lamp body back surface wall and the reflector unit. Thus, the length of a leg formed on the reflector unit side to support a ball joint or other member that forms the aiming pivot point is made shorter. Therefore, the rigidity of the leg as a portion surrounding the aiming pivot point is enhanced.

DETAILED EMBODIMENTS OF THE INVENTION

An embodiment of the present invention will be described with reference to the drawings.

Figure 1:
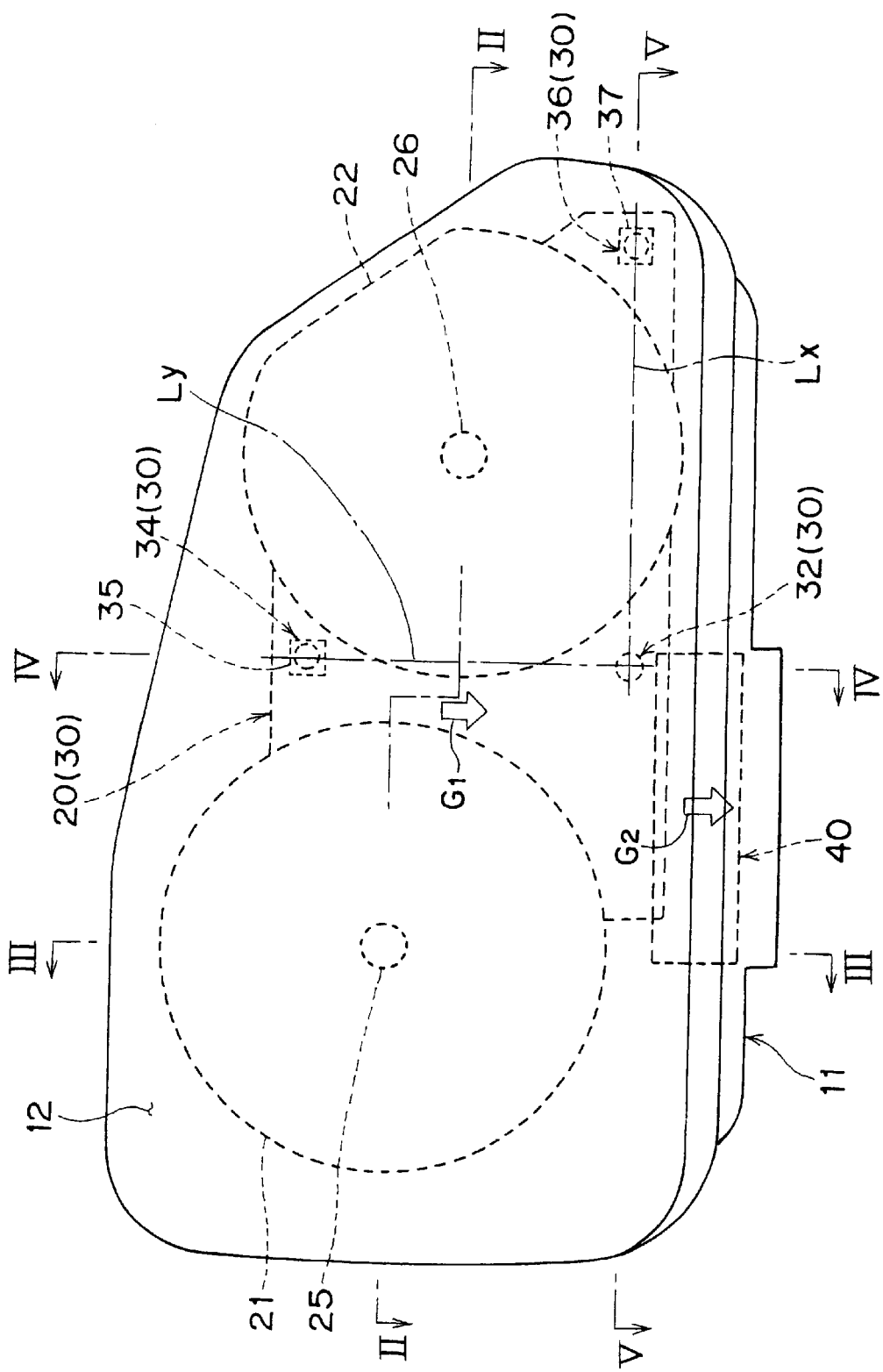
FIG. 1 is a front view showing a vehicle headlamp according to an embodiment of the invention.
Figure 2:
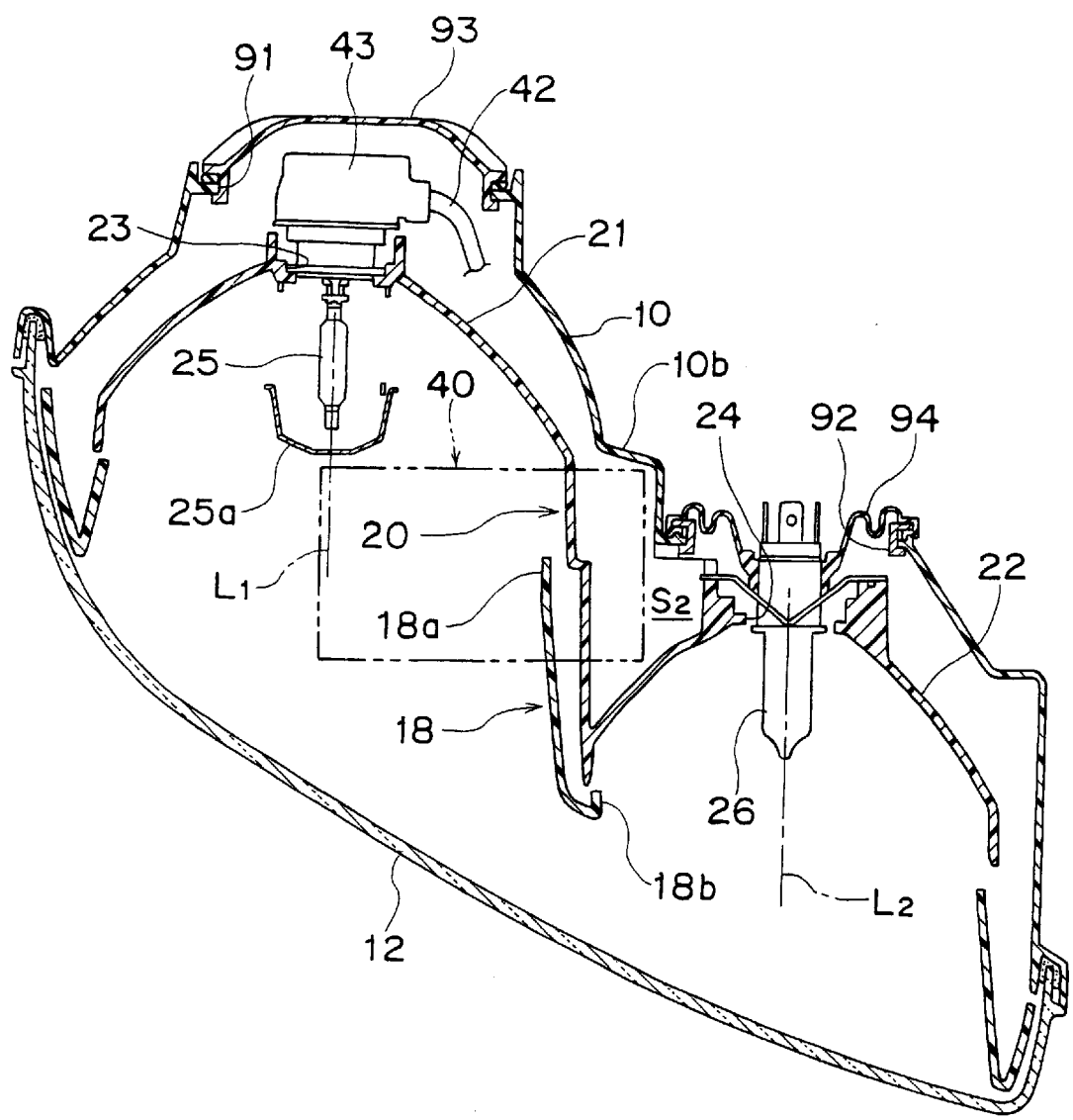
FIG. 2 is a horizontal sectional view showing the headlamp (taken along the line II—II of FIG. 1).
Figure 3:
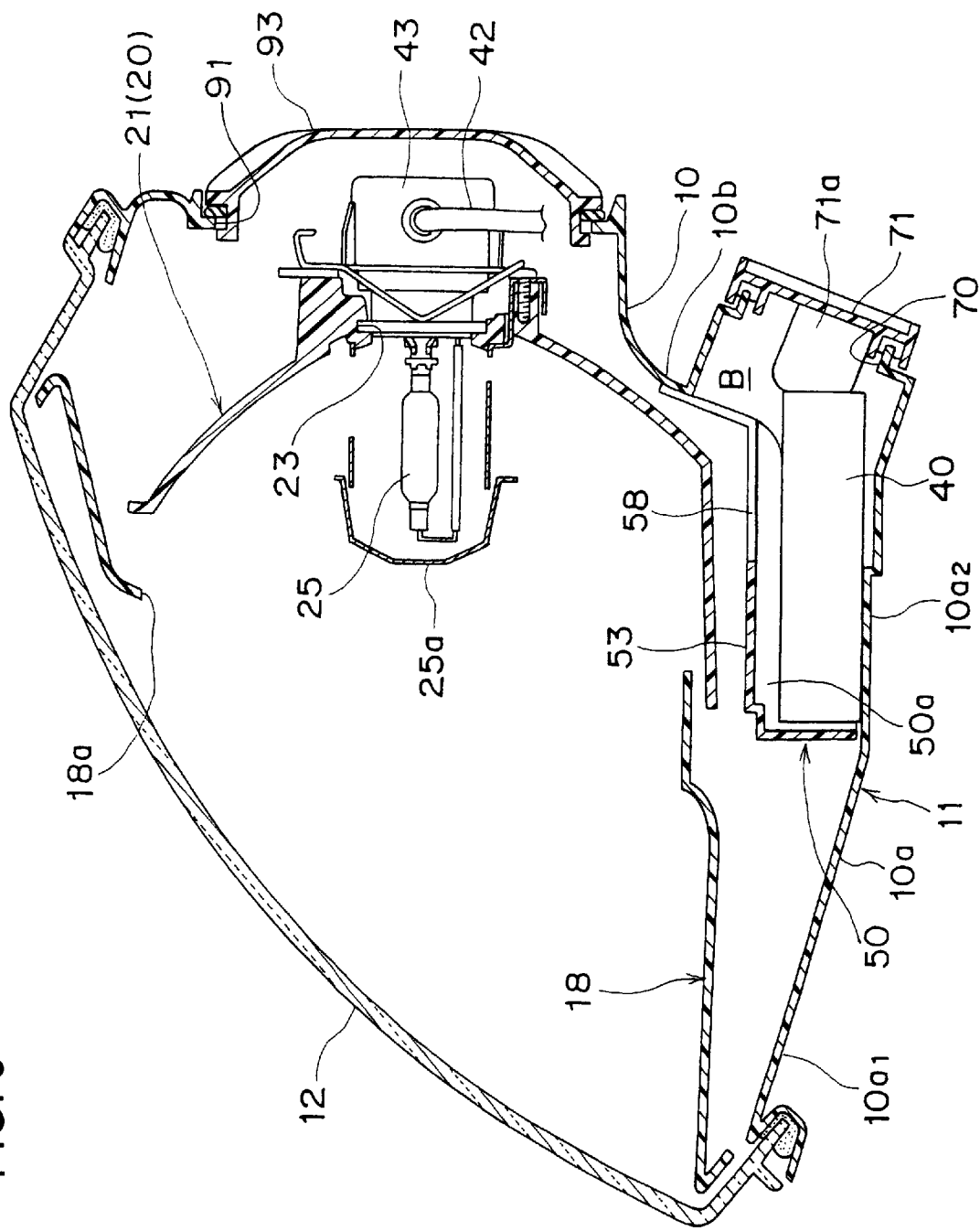
FIG. 3 is a longitudinal sectional view of the headlamp (taken along the line III—III of FIG. 1).
Figure 4:
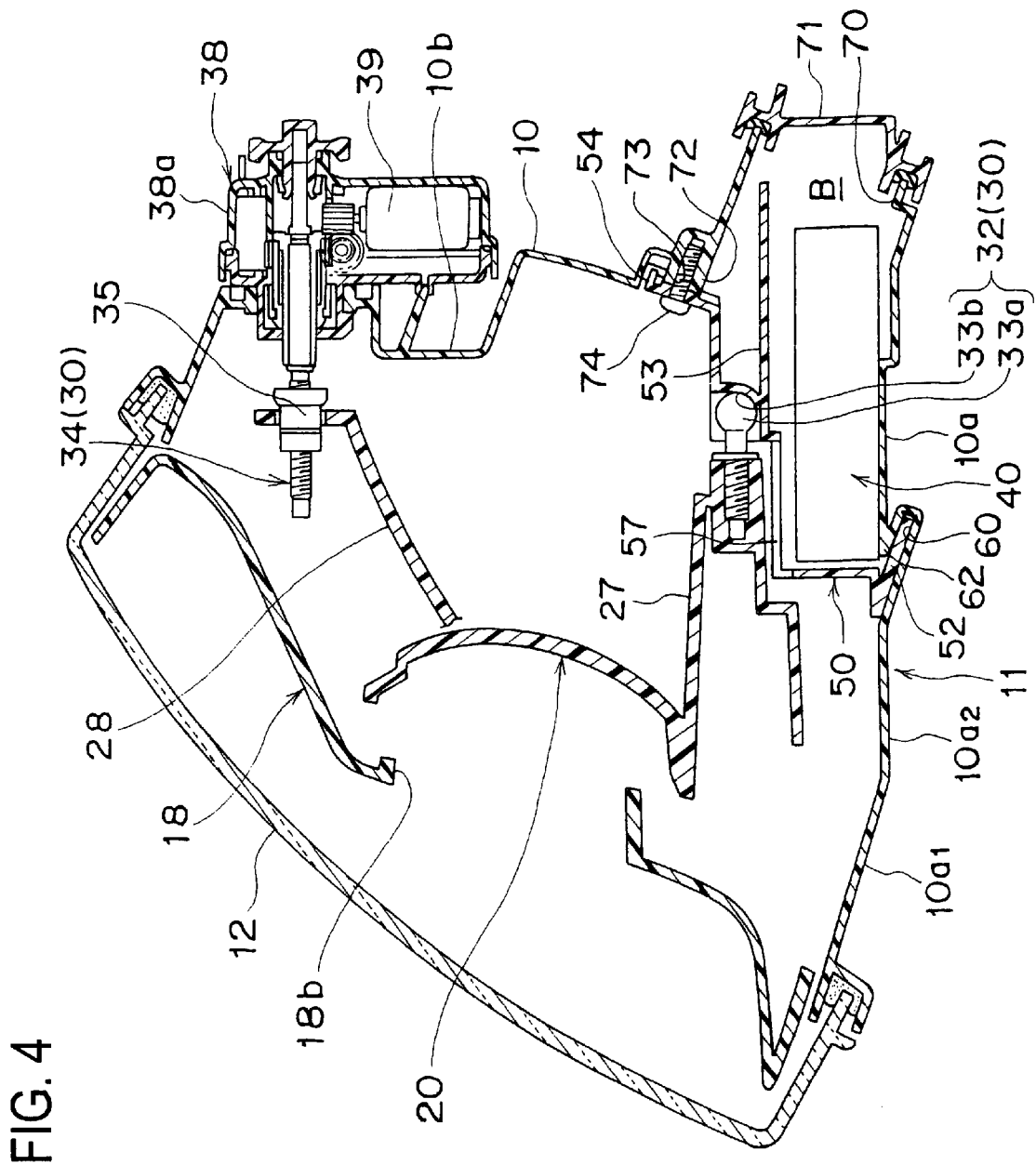
FIG. 4 is a longitudinal sectional view of the headlamp (taken along the line IV—IV of FIG. 1).
Figure 5:
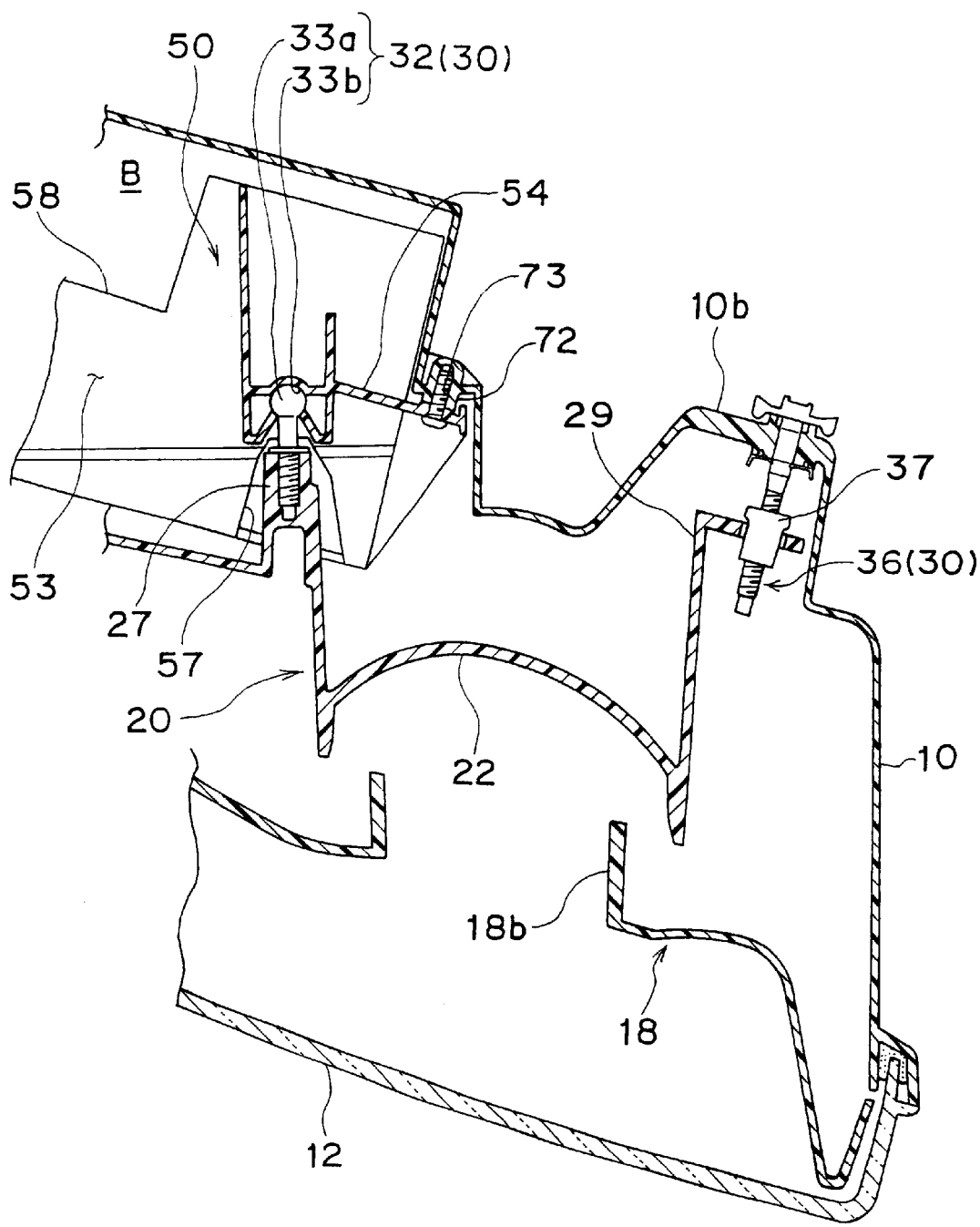
FIG. 5 is an enlarged horizontal sectional view showing the headlamp at the aiming pivot point disposition position (taken along the line V—V of FIG. 1).
Figure 6:
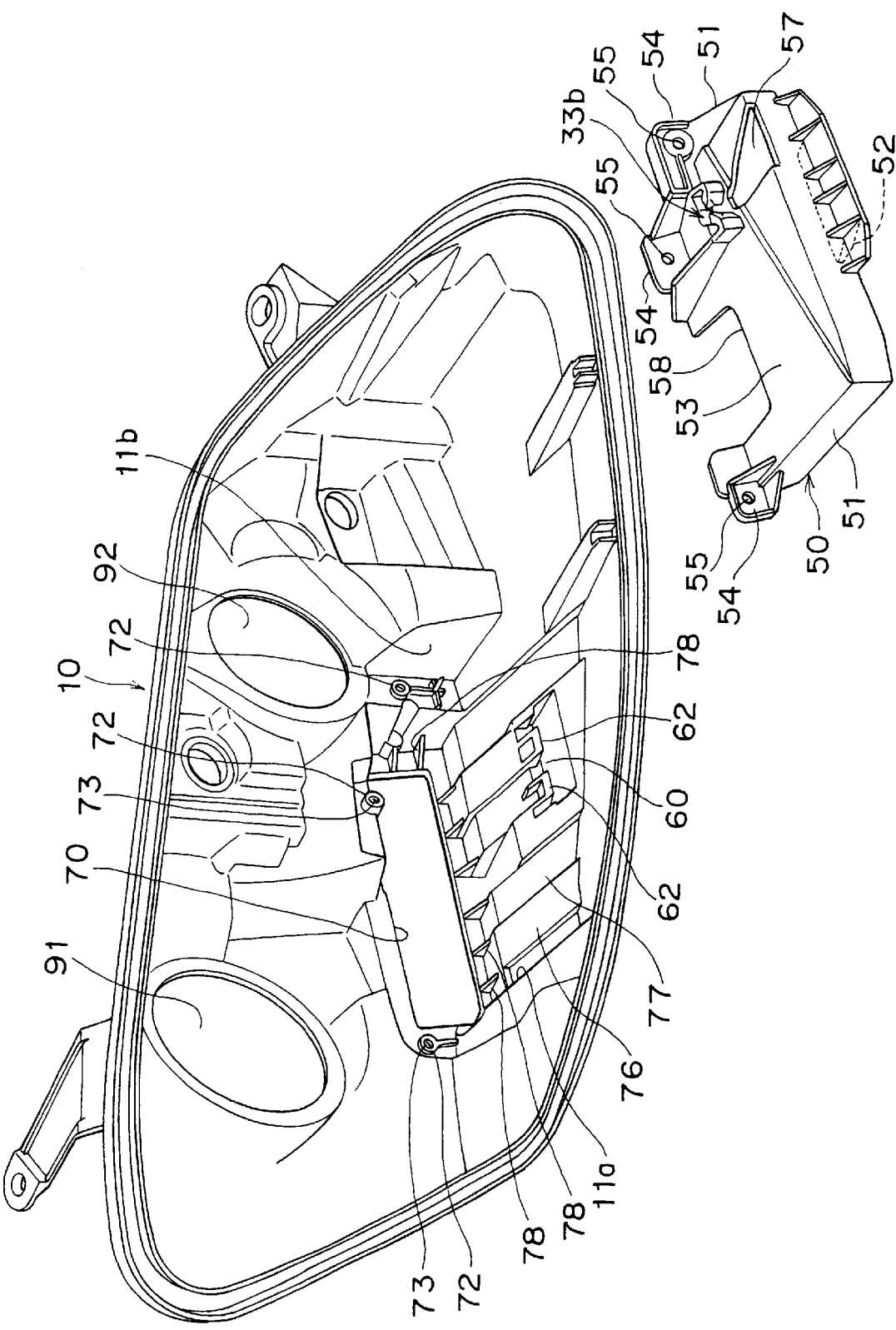
FIG. 6 is an exploded perspective view showing the lamp body and the ballast cover.
Figure 7:
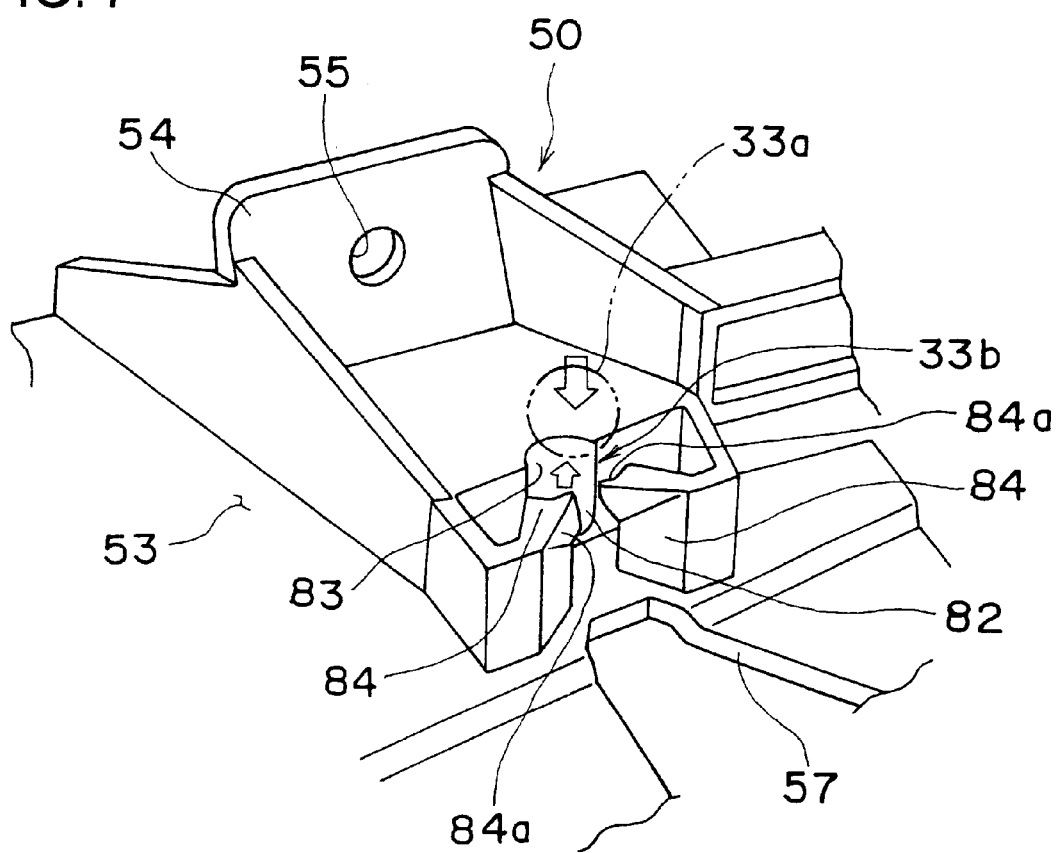
FIG. 7 is an enlarged perspective view showing the ball bearing portion that constitutes the ball joint as the aiming pivot point.
Figure 8:
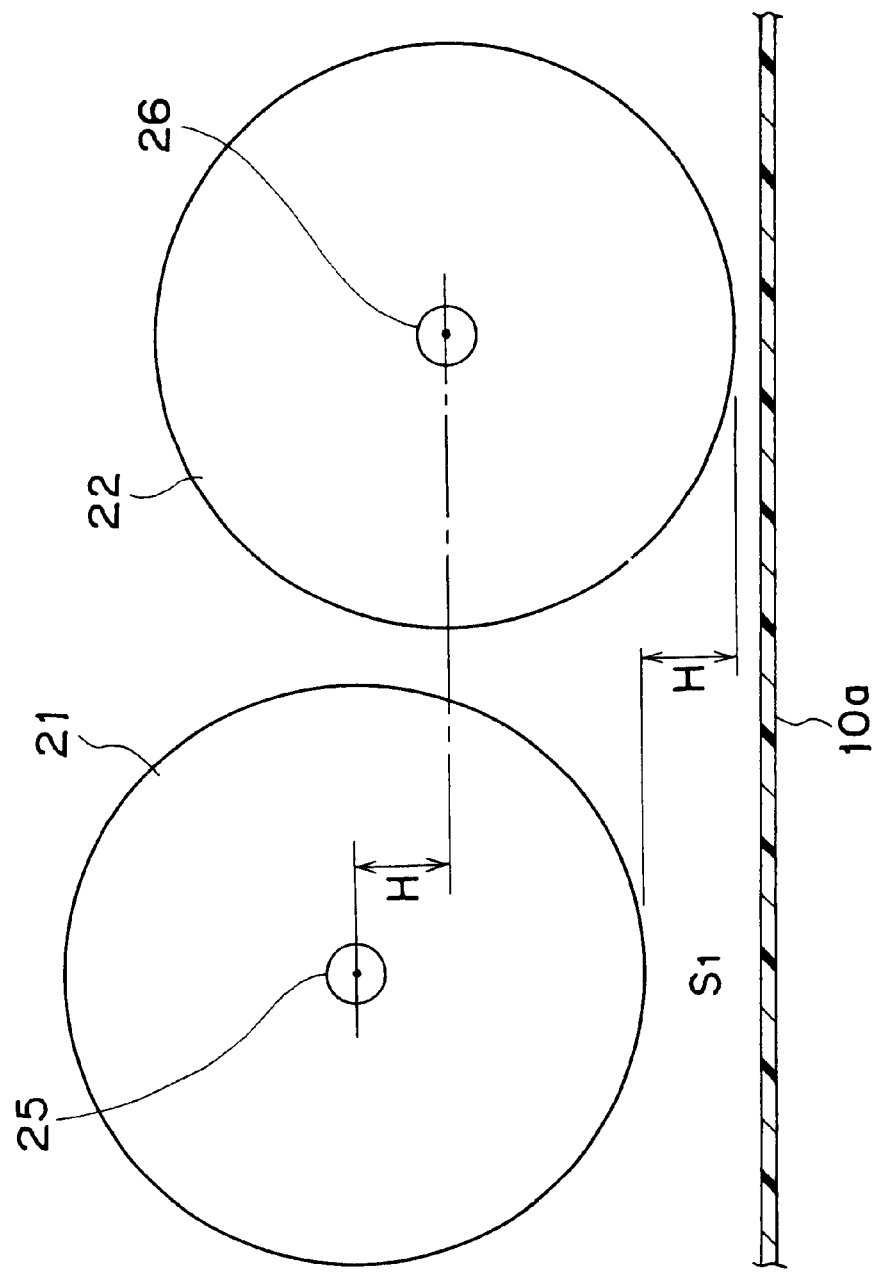
FIG. 8 shows the enlarged space formed below the reflector offset upward.
Figure 9:
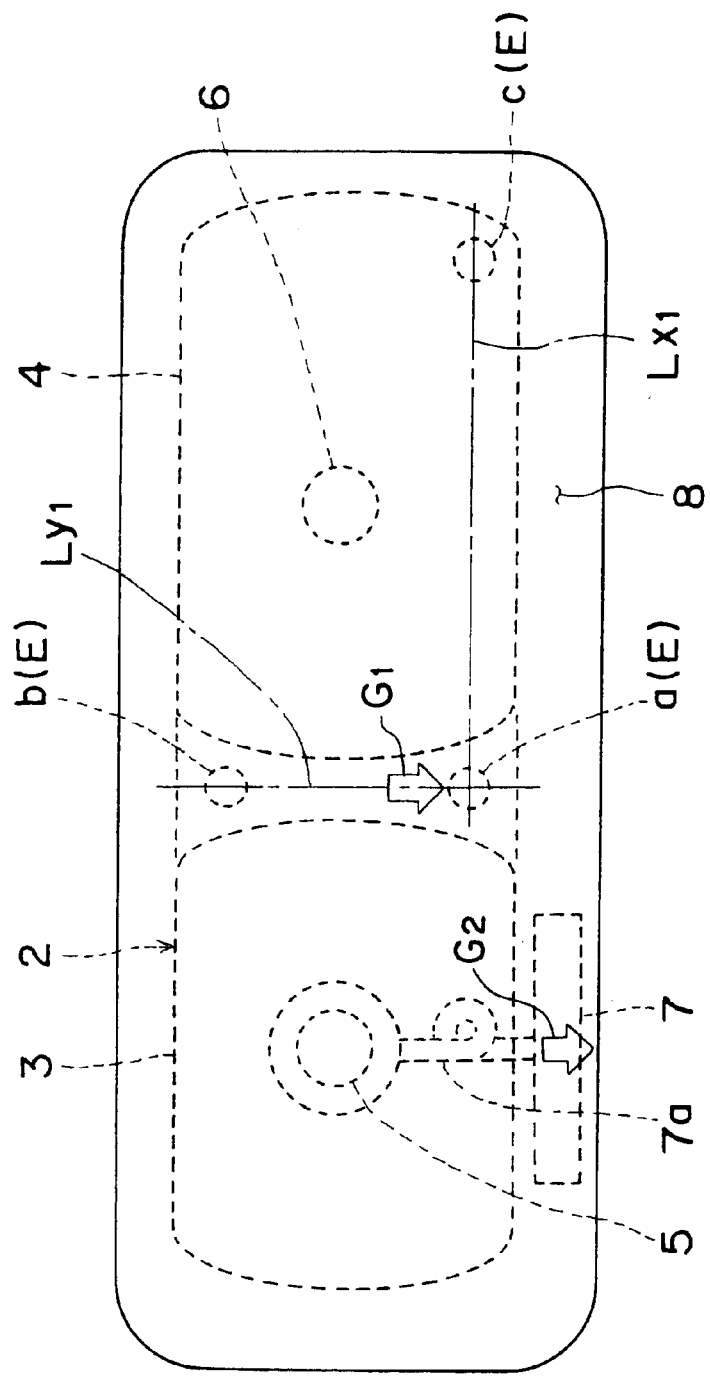
FIG. 9 is a front view showing a conventional headlamp.

FIGS. 1 through 8 show a vehicle headlamp according to an embodiment of the present invention. In the embodiment, the present invention is applied to a movable reflector type headlamp. FIG. 1 is a front view showing the headlamp. FIG. 2 is a horizontal sectional view showing the headlamp taken along the line II—II of FIG. 1. FIG. 3 is a longitudinal sectional view of the headlamp taken along the line III—III of FIG. 1. FIG. 4 is a longitudinal sectional view of the headlamp taken along the line IV—IV of FIG. 1. FIG. 5 is an enlarged horizontal sectional view showing the headlamp at the aiming pivot point disposition position taken along the line V—V of FIG. 1. FIG. 6 is an exploded perspective view showing the lamp body and the ballast cover. FIG. 7 is an enlarged perspective view showing a ball bearing portion that constitutes the ball bearing that is the aiming pivot point. FIG. 8 shows an enlarged space formed below the reflector offset upward.

In these figures, a container-shaped lamp body 10 is made of synthetic resin. The front of the body 10 corresponds to an area extending from a front to a side of a vehicle body. A curved front lens 12 is assembled into a nearly rectangular front opening portion in the lamp body 10. A lamp chamber space is formed by the lamp body 10 and the front lens 12. The lamp chamber space houses a reflector unit 20, which integrates a first reflector 21 for reflecting light to form a low beam and a high beam and a second reflector 22 to reflect light to form a high beam. The reflectors 20, 21 are placed at a predetermined distance from each other in a lateral direction.

Bulb insertion holes 23, 24 are formed on rear apex portions of the reflectors 21, 22. A discharge bulb 25 and a halogen bulb 26 as light sources are fitted in the bulb insertion holes 23, 24. An output cord 42 (see FIGS. 2, 3) that extends from a ballast circuit unit 40 disposed below the reflector unit 20 is connected to a back end portion of the discharge bulb 25 through a connector 43. The ballast circuit unit 40 allows the discharge bulb 25 to discharge stably. As shown in FIGS. 3 and 4, it is housed in and secured to a ballast housing chamber B formed along an inner side of a lamp body bottom surface wall 10a.

A reference numeral 25a denotes a shade which is provided ahead of the discharge bulb 25 and which blocks a light that travels from a light emitting portion of the bulb 25 toward areas other than a predetermined effective reflective surface of the reflector 21. The shade 25a contributes to form a predetermined light distribution and prevents a direct light from being emitted from the front lens 12.

As shown in FIGS. 1 and 8, the reflectors 21, 22 are offset in the vertical direction so that a bottom surface of the reflector 21 is located at a position higher than a bottom surface of the reflector 22 by H. A first space S1 large enough to house the ballast circuit unit 40 is provided below the reflector 21. In addition, as shown in FIG. 2, the reflectors 21, 22 are offset in the fore-and-aft direction so that the reflector 21 is located behind the reflector 22 (the reflector 22 is located ahead of the reflector 21). A second space S2 continuous to a side of the first space S1 is provided behind the reflector 22 that is adjacent to the reflector 21.

Namely, the first space S1 is enlarged toward the reflector 22 by a space equivalent to the second space S2.

The ballast circuit unit 40 is disposed to extend over the first space S1 and the second space S2 as shown by the imaginary line in FIG. 2. The position of a center of gravity G2 of the ballast circuit unit 40 and the position of a center of gravity G1 of the headlamp excluding the ballast circuit unit 40 are close to each other (see FIGS. 1 and 2).

The reflector unit 20 is supported to tilt in a vertical direction and a lateral direction with respect to the lamp body 10 by an aiming mechanism 30 including one ball joint 32 and two aiming screws 34, 36 (vertical aiming screw 34, lateral aiming screw 36). The reflector unit 20 is constructed to tilt about a horizontal axis Lx and a vertical axis Ly by rotating the aiming screws 34, 36.

As shown in FIG. 4, the ball joint 32 includes a ball 33a which is supported by a ball bearing portion 33b provided above the ballast housing chamber B formed on the inner side of the lamp body bottom surface wall 10. The ball 33a is fixedly provided at an end portion of a leg 27 that extends in a lower portion in an area between the reflectors 21, 22. The ball joint 32 constitutes an aiming pivot point of the reflector unit 20 (reflectors 21, 22).

As shown in FIGS. 4 and 5, the aiming screws 34, 36 are rotatably supported in screw insertion holes provided in a back surface wall 10b of the lamp body 10, respectively. At the same time, they penetrate the lamp body back surface wall 10b in a fore-and-aft direction to extend forward. Nuts 35, 37 are screwed to front end portions of the screws 34, 36 to be attached to brackets 28, 29 that extend toward the reflector unit 20.

The ball joint 32 and the aiming screws 34, 36 are disposed to be orthogonal as viewed from the front as shown in FIG. 1. When the aiming screws 34, 36 are rotated, the nuts 35, 37 advance or retreat along the aiming screws 34, 36, and the reflector unit 20 (reflectors 21, 22) tilt about the horizontal axis Lx (the axis passing through the ball joint 32 and the nut 37) and the vertical axis Ly (the axis passing through the ball joint 32 and the nut 35). Thus, optical axes L1, L2 of the reflectors 21, 22 can be tiltably adjusted in the vertical and lateral directions.

A reference numeral 38 in FIG. 4 denotes an auto-leveling actuator. A driving motor 39 for driving the vertical aiming screw 34 for rotation is provided in an actuator case 38a. The auto-leveling actuator 38 controls rotation of the vertical aiming screw 34 to adjust tiltably the reflector unit 20 (reflectors 21, 22) about the horizontal axis Lx. The actuator 38 does this by controlling the driving of the motor 39 to maintain a constant tilt of the optical axis of the headlamp with respect to a road surface in accordance, for example, with an output from a tilt sensor that detects tilt (a tilting angle) in a fore-and-aft axis of the vehicle body.

Thus, in the embodiment, when the ball joint 32 is provided between the top surface wall of the ballast housing chamber B and the reflector unit 20 instead of between the lamp body back surface wall 10b and the reflector unit 20, the distance between the members where the ball joint 32 is interposed is made shorter. As a result, the leg 27 formed on the side of the reflector unit 20 to provide the ball 33a in the ball joint 32 is shorter than in the case in which the aiming pivot point is provided between the lamp body back surface wall 10b and the reflector unit 20. This arrangement enhances rigidity of the leg 27, which serves as the portion surrounding the aiming pivot point.

A ballast cover 50, made of synthetic resin and integrally attached to the inner side of the lamp body bottom surface wall 10a, forms the ballast housing chamber B in cooperation with the lamp body bottom surface wall 10a. As shown in FIG. 6, a longitudinal cross section of the ballast cover 50 is L-shaped. The cover 50 is made of a pair of right and left side surface walls 51 and is formed into a frame to cover the entire ballast circuit unit 40.

Ribs 50a (see FIG. 3) that extend in a longitudinal direction are provided at predetermined intervals in the lateral direction on the inside of the ballast cover 50. A lid 71 is fitted in an opening portion 70 that opens behind the ballast housing chamber B as shown in FIGS. 3, 4, and 6. A longitudinal rib 71a is integrally formed with the lid 71. In a configuration in which the ballast cover 50 is integrally attached to the inside of the lamp body bottom surface wall 10a to form the ballast housing chamber B, the ballast circuit unit 40 is surrounded by the ribs 50a of the ballast cover 50, the longitudinal rib 71a on the lid 71, and the lamp body bottom surface wall 10a, and is maintained in the ballast housing chamber B to prevent it from vibrating.

A tongue-shaped protrusion 52 that extends rearward is formed at a leading edge lower end portion of the ballast cover 50 as shown in FIG. 4. Screwing brackets 54 having fore-and-aft through holes are formed to extend upward on a back end portion side of a ballast cover top surface wall 53.

On the other hand, part of the area of the lamp body bottom surface wall 10a is formed to expand downward to secure a sufficient space for housing the ballast circuit unit 40 below the reflector unit 20. As shown in FIGS. 3 and 4, a leading edge area 10a1 of the lamp body bottom surface wall 10a tilts downward from the lamp body front opening portion toward the rear to continue to a horizontal area 10a2, thereby forming an expanded portion 11 (see FIG. 1) whose size nearly corresponds to the width of the reflector unit 20.

Inner side walls 11a, 11b (see FIG. 6) that rise nearly vertically and are opposite to each other in the lateral direction on the inside of the expanded portion 11 are formed at positions corresponding to the right and left side surface walls 51 of the ballast cover 50, thereby positioning the ballast cover 50 in the lateral direction.

The opening portion 70 that communicates with the ballast housing chamber B is formed on the lamp body back surface wall 10b that faces the area sandwiched between the inner side walls 11a, 11b on the inside of the expanded portion 11. The ballast circuit unit 40 can be taken out and in through the opening portion 70.

Bosses 72 against which the screwing brackets 54 on side of the ballast cover 50 can be abutted are provided on a circumferential edge of the opening portion 70. Each of these bosses 72 is provided with a screw hole 73. The bosses 72 are abutted against the brackets 54 on the side of the ballast cover 50 to position correctly the ballast cover 50 in the fore-and-aft direction. In addition, the ballast cover 50 is positioned correctly in the vertical and lateral direction when the brackets 54 on the side of the ballast cover 50 are secured to the bosses 72 with screws 74.

A wide protruding rib 76 and a wide recessed rib 77 extending in the fore-and-aft direction are formed to be continuous with each other in the lateral direction in the area sandwiched between the inner side walls 11a, 11b in the lamp body bottom surface wall 10a as shown in FIG. 6, whereby rigidity of the lamp body bottom surface wall 10a for a weight load of the ballast circuit unit 40 is ensured.

Ribs 78 are provided at nearly equal intervals on the circumferential edge of the opening portion 70 for ballast circuit unit replacement, and thus rigidity of the circumferential edge of the opening portion 70 for the weight load of the ballast circuit unit 40 is also ensured.

An engaging groove 60 with which the tongue-shaped protrusion 52 of the ballast cover 50 are slidably engaged is provided in the area sandwiched between the inner side walls 11a, 11b on the inside of the expanded portion 11. The engaging groove 60 tilts obliquely downward toward the rear as shown in FIGS. 4 and 6, and a pair of hooks 62, 62 for latching the tongue-shaped protrusion 52 on the ballast cover 50 side are provided at a leading edge portion of the engaging groove 60. The engaging groove 60 is engaged with the tongue-shaped protrusion 52 to position correctly the ballast cover 50 in the fore-and-aft direction and the vertical direction.

To attach the ballast cover 50 onto the lamp body 10, the ballast cover 50 is inserted from the front of the lamp body 10 along the lamp body bottom surface wall 10a (the expanded portion 11), and the tongue-shaped protrusion 52 of the ballast cover 50 is slid to engage with the engaging groove 60. The screwing brackets 54 abut against the bosses 72 on the lamp body 10 side. Therefore, by screwing the brackets 54 to the bosses 72, the ballast cover 50 is positioned, fixed, and integrated with the lamp body bottom surface wall 10a.

The end faces of the screwing brackets 54 and bosses 72 tilt rearward with respect to a vertical plane as shown in FIG. 4, which facilitates screwing of the brackets 54.

As shown in an enlarged view in FIG. 7, the ball bearing portion 33b of the ball joint 32 as the aiming pivot point is provided on a top surface of the ballast cover 50. The ball bearing portion 33b including a spherical surface 82 and a pair of sandwiching jaws 84 is integrally formed on the ballast cover top surface wall 53. The spherical surface 82 is surrounded by the pair of sandwiching jaws 84 formed like V-shaped standing walls which are opposite to each other. The ball 33a of the ball joint 32 is pressed against the spherical surface 82, maintained in a clamped state, and supported by latching front end portions 84a of the pair of sandwiching jaws 84. The spherical surface 82 continues to an upper cylindrical outer peripheral surface 83 and the ball bearing portion 33b opens upward. It is therefore possible to push the ball 33a into the ball bearing portion 33b from the above to engage the ball with the ball bearing portion and alternatively to pull the ball upward such that the ball is removed from the ball bearing portion.

A reference numeral 57 in FIGS. 4, 6, and 7 denotes a cutout formed at a leading edge portion of the ballast cover 50. The cutout 57 is located at a position corresponding to the leg 27 on the side of the reflector unit 20 provided with the ball 33a, and functions to avoid interference with the reflector unit 20 (leg 27) that tilts by aiming.

A reference numeral 58 in FIGS. 5 and 6 denotes a cutout formed in the ballast cover top surface wall 53. The cutout 58 is formed to have a size that allows the connector 43 to pass through so that the output cord 42 can be removed together with the ballast circuit unit 40 when the ballast circuit unit 40 is removed from the opening portion 70.

To install the reflector unit 20 in the lamp body 10, the aiming screws 34, 36 are first installed in the lamp body 10, and the ball member (ball 33a) and the nuts 35, 37 are mounted to the legs 27, 28, 29 of the reflector unit 20. Then, the reflector unit 20 is placed in the lamp body 10, and the reflector unit 20 is moved and pushed so that the ball 33a is pushed into the opening portion in the ball bearing portion 33b. Thus, the ball 33a can easily engage with the ball bearing portion 33b. Then, the nuts 35, 37 are aligned with the leading edges of the aiming screws 34, 36 and the aiming screws 34, 36 are rotated to screw the nuts 35, 37 on the aiming screws 34, 36. Thus, the reflector unit 20 is integrated with the lamp body 10 through the aiming mechanism 30.

When the reflector unit 20 is removed from the lamp body 10, the procedure for installing the reflector unit 20 in the lamp body 10 is reversed.

An extension reflector 18 of a rectangular frame shape is disposed between the front opening portion of the lamp body 10 and the front lens 12 and extends to hide a clearance between the reflector unit 20 (reflectors 21, 22) and the lamp body 10. Opening portions 18a, 18b are formed to correspond to the reflectors 21, 22. The surface of the extension reflector 18 is deposited with aluminum as with the reflectors 21, 22. When the lamp is viewed from the front, the entire part of the inside of the lamp chamber looks deep and metallic when the lamp is off, giving a good appearance.

Reference numerals 91, 92 denote opening portions for bulb replacement provided at positions facing the bulb insertion holes 23, 24 in the lamp body back surface wall 10b. A back cover 93 is fitted in the opening portion 91 and a rubber dust-proof, waterproof cover 94 is fitted in the opening portion 92.

In the above-mentioned embodiment described, the discharge bulb 25 is mounted only in the reflector 21. However, the headlamp can be constructed such that the discharge bulb 25 is also mounted in the other reflector 22.

In the above-mentioned embodiment, the reflector unit 20 with the integrated right and left reflectors 21, 22 is supported by the aiming mechanism 30 and is tiltable with respect to the lamp body 10. The invention can also be applicable to a headlamp in which each of right and left reflectors is mounted independently, and each reflector can be made to tilt independently with respect to the lamp body by the respective aiming mechanisms.

In the above-mentioned embodiment, the downwardly expanded portion 11 is formed in the area of the lamp body bottom surface wall 10a for housing the ballast circuit unit 40. The lamp body bottom surface wall 10a may also be formed into a flat shape without providing the downwardly expanded portion 11.

In addition, in the above-mentioned embodiment, the ball bearing portion 33b that makes up the ball joint 32 is provided in the ballast cover 50. However, the ball bearing portion 33b may be provided at the leading edge of the leg formed on the lamp body back surface wall 11b. Furthermore, the leg 27 on the reflector unit 20 side supporting the ball 33a may be made longer. Therefore, the ball bearing portion 33b can be directly provided on the lamp body back surface wall 10b.

According to an embodiment of the present invention, problems of abnormal noise, asymmetric friction, and misaligned optical axis caused by the headlamp body vibration are eliminated by placing the ballast circuit unit near the position of the center of gravity of the headlamp excluding the ballast circuit unit.

Furthermore, the construction of the aiming mechanism is made simple and the ballast housing chamber can be provided to avoid interferences with the aiming mechanism. Also, the degree of freedom in the layout of the ballast cover is enhanced and thus the aiming mechanism and the ballast housing chamber can be designed more easily.

Because the ballast circuit unit is housed in the ballast housing chamber to prevent rattling, abnormal noise can be prevented.

Moreover, the distance between members where the aiming pivot point is interposed is made shorter to enhance the rigidity of the portion surrounding the aiming pivot point. Such a construction guarantees correct aiming alignment over a long period of time.

Other implementations are within the scope of the following claims.

What is claimed is:

1. A vehicle headlamp comprising:

a lamp body;

first and second reflectors disposed in the lamp body;

a discharge bulb fitted in at least one of the reflectors; and a ballast circuit disposed at a lower portion in the lamp body to allow the discharge bulb to discharge stably, wherein the first and second reflectors are offset in a vertical direction so that a bottom surface of the first reflector is located at a higher position than a bottom surface of the second reflector that is adjacent to the first reflector, the first reflector is offset with respect to the second reflector in a fore-and-aft direction so that the first reflector is located behind the second reflector, and the ballast circuit unit is disposed in an enlarged space that extends from below the first reflector to a back of the second reflector in the lamp body.

2. The vehicle headlamp according to claim 1, wherein the first and the second reflectors are integrated with each other to form a reflector unit, and are tiltably supported by an aiming mechanism interposed between the lamp body and the reflector unit.

3. The vehicle headlamp according to claim 1, wherein the ballast circuit unit is housed in a ballast housing chamber defined by a ballast cover attached to the lamp body and a lamp body bottom surface wall.

4. The headlamp vehicle according to claim 3, wherein the ballast cover is provided with an aiming pivot point of the aiming mechanism.

* * * * *